April 5, 1927.  
E. L. HARRY  
1,623,725  
TRANSMISSION MECHANISM FOR MOTOR VEHICLES  
Original Filed Feb. 28, 1924  3 Sheets-Sheet 1
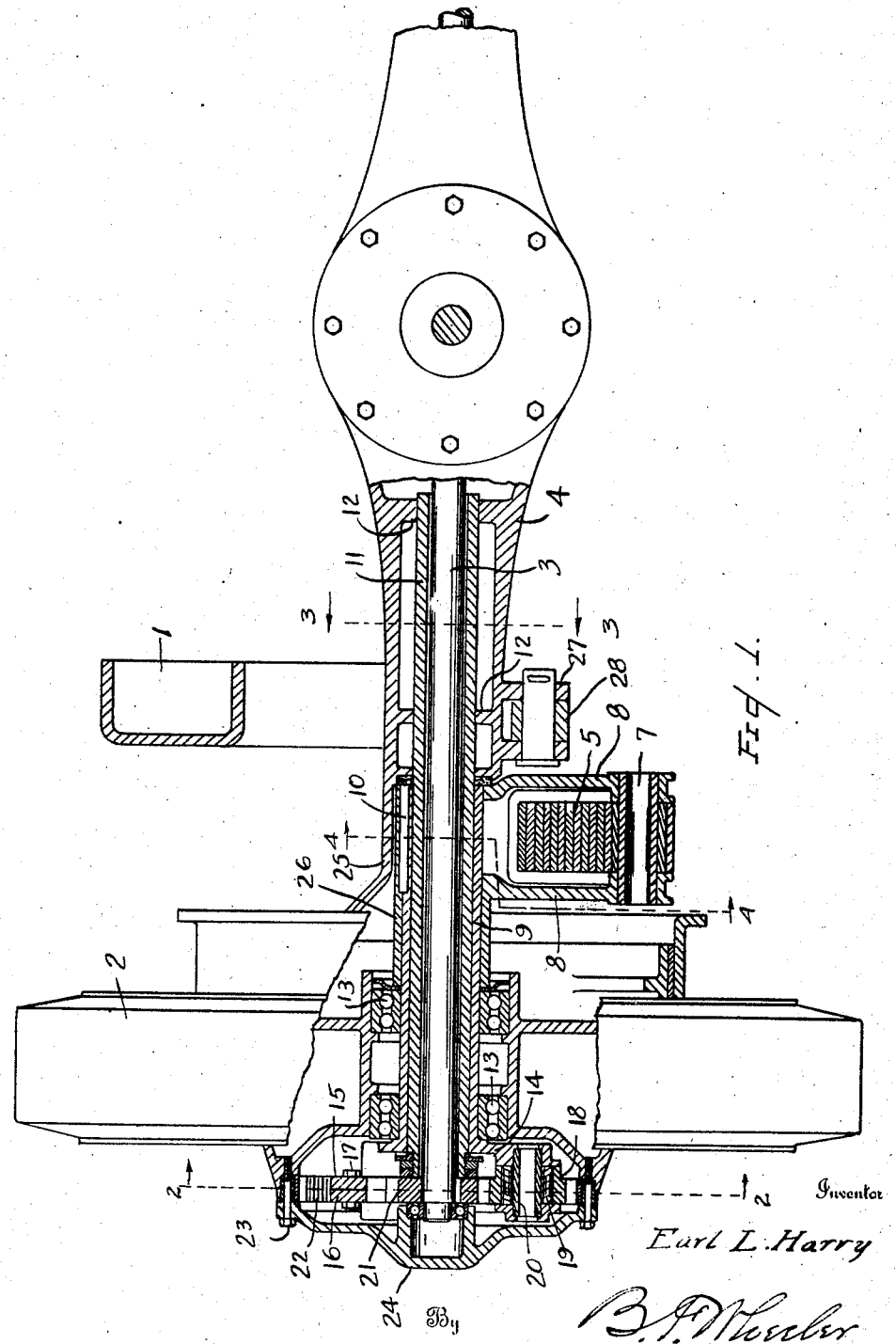
Inventor  
Earl L. Harry  
By  
Attorney

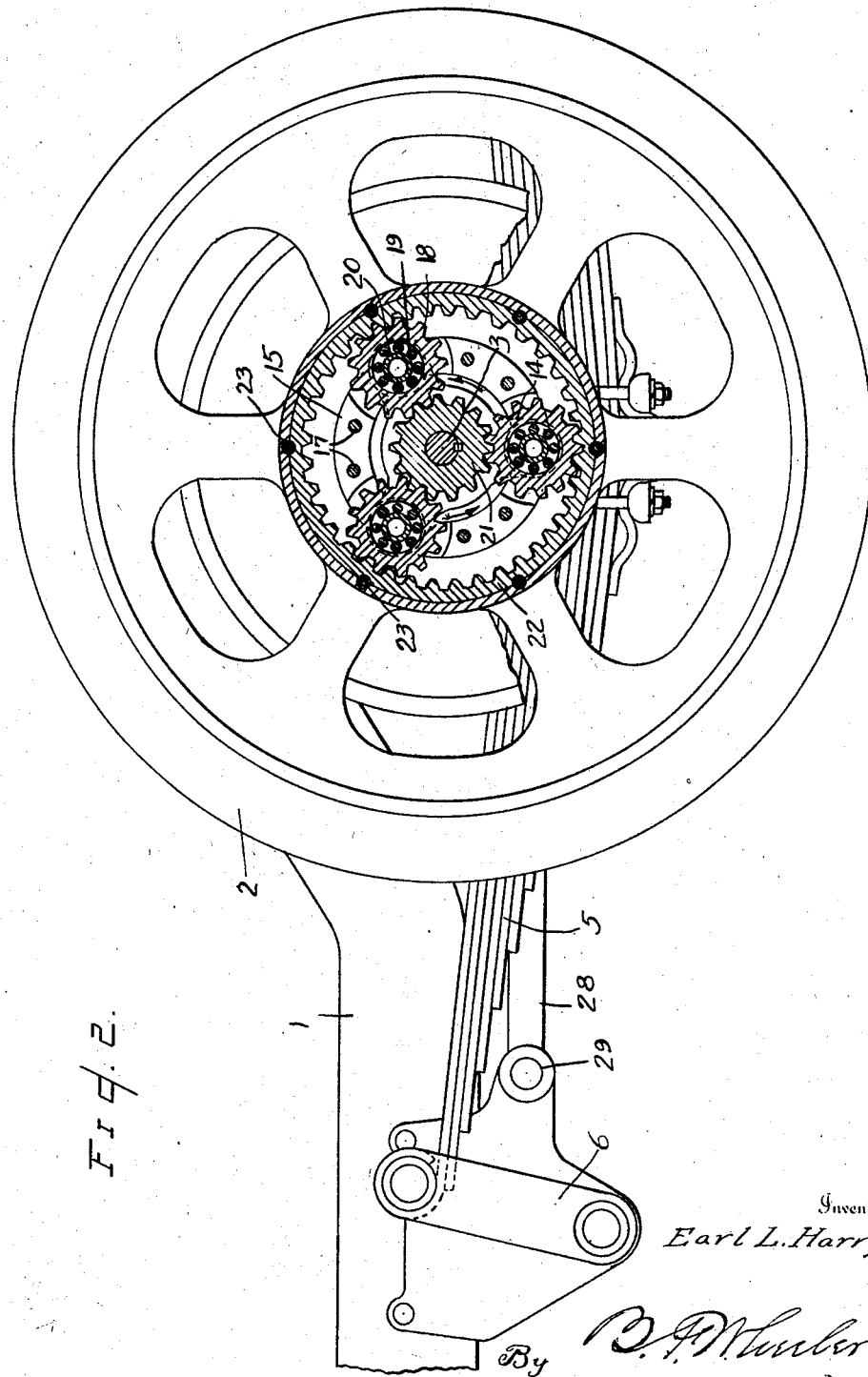

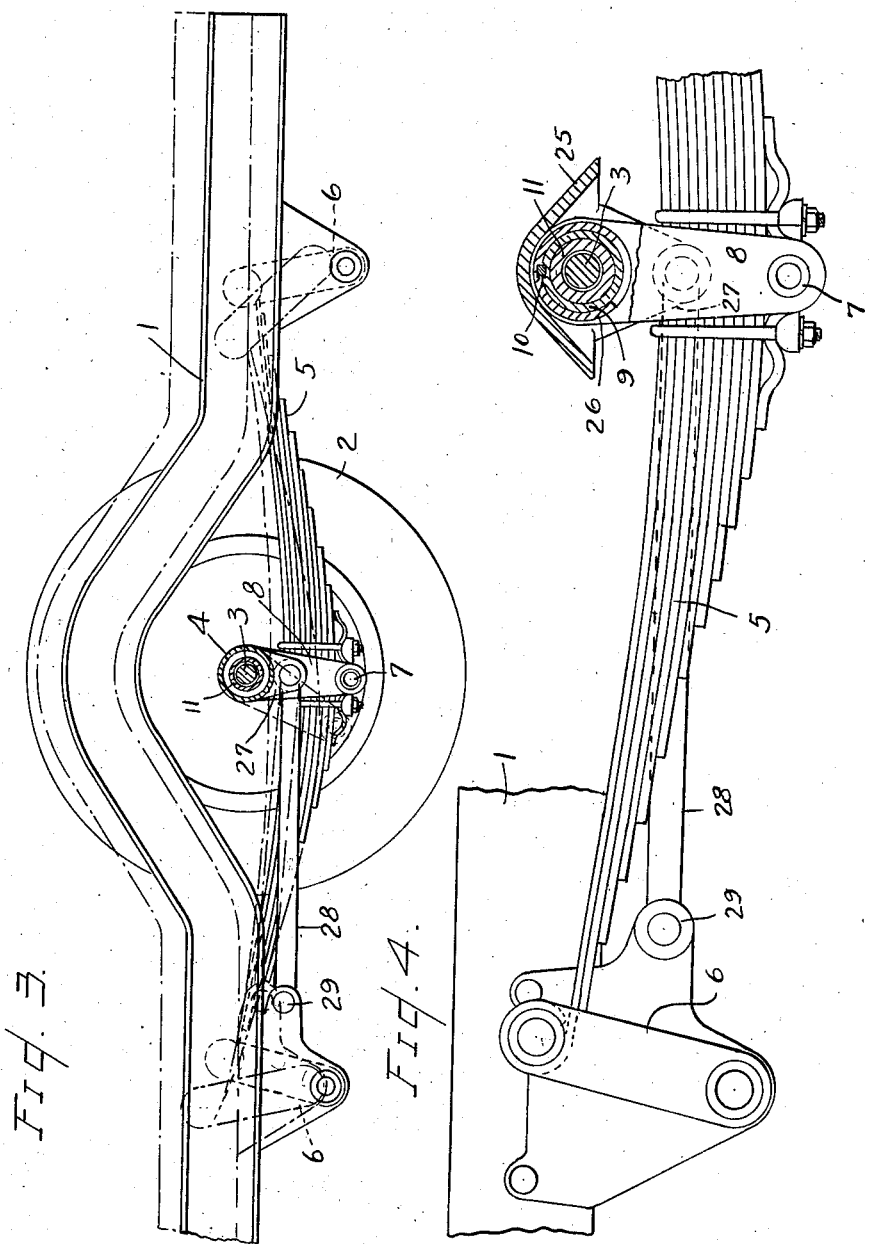

Patented Apr. 5, 1927.

1,623,725

UNITED STATES PATENT OFFICE.

EARL L. HARRY, OF PONTIAC, MICHIGAN, ASSIGNOR TO EDWARD S. EVANS, OF DETROIT, MICHIGAN.

TRANSMISSION MECHANISM FOR MOTOR VEHICLES.

Application filed February 28, 1924, Serial No. 695,633. Renewed December 27, 1926.

This invention relates to motor vehicle transmission mechanisms, and more particularly to transmission mechanisms carried by the rear axles of motor vehicles.

It is an object of the invention to provide for cushioning the shocks and stresses to which the driven parts are subjected upon initial establishment of the drive, particularly when a heavy resistance must be overcome, as when traction conditions are adverse, and it is also an object to cushion such shocks and stresses as are met with by the driven parts in transit of the vehicle, arising for example from a sudden application of the brakes or from an encounter of the vehicle wheels with some obstacle in the roadway.

A further object is to effect a shifting of the vehicle body in its load when the driving force encounters an abnormally heavy resistance, so that the load acts to a considerable extent to supplement the force applied by the vehicle motor in overcoming such resistance.

Still another object is to provide a construction that will cause the weight of the load to supplement the driving power when a considerable resistance is encountered, and will maintain the usual co-axial relation of the rear live axle and its housing, in accomplishing this result, and which further will avoid necessity for rocking said housing or subjecting the same to torsional stresses.

In attaining these and various other objects, the invention contemplates, in a preferred embodiment, driving a ground wheel from a co-axial live axle by a speed-reducing gear train comprising pinions meshing with a driving gear on said axle, and with an annular driven gear fast upon the wheel, said pinion being eccentrically journaled upon the outer end of a sleeve enclosing said live axle, and a depending arm being fast upon said sleeve to carry a load support, which, when the resistance to the drive exceeds the restraint exercised upon said sleeve by the load, is angularly actuated reversely to the direction in which the wheel is driven, through an orbital travel of said pinions.

Said preferred embodiment of the invention is hereinafter described, and is illustrated in the accompanying drawings, wherein, Fig. 1 is a view in vertical section of a rear axle of a vehicle and one of the ground wheels thereof, the plane of section being through the wheel axis and the direction of view being rearward.

Fig. 2 is a view of the same in side elevation, partly in section on line 2—2 of Fig. 1.

Fig. 3 is a vertical sectional elevation, taken on line 3—3 of Fig. 1, indicating in dash lines the position of the parts when elevated, in shock absorbing position.

Fig. 4 is a fragmentary sectional view, on line 4—4 of Fig. 1, showing the mounting of the frame upon the axle.

In these views the reference character 1 designates one of the sills of a vehicle frame, 2 one of the rear ground wheels, 3 a live axle, co-axial with said wheel, 4 a housing for said axle, and 5 a leaf-spring having its ends shackled to said sill as indicated at 6. At its mid-point said spring is seated upon a tubular member 7, the ends of which are mounted in the lower ends of a pair of arms 8, rigidly depending from a sleeve 9 enclosing the axle 3, one at each side of said spring. 10 designates a key whereby the arms 8 are secured to the sleeve 9 for angular movement in unison with said sleeve. 11 is a tubular extension of the housing 4, enclosing the live axle 3 within the sleeve 9, the inner portion of said extension being rigidly engaged with the housing 4. This engagement may be established by forcing the member 11 under heavy pressure into openings formed by internal annular flanges 12 of said housing. The wheel 2 is journaled upon the sleeve 9 through anti-friction bearings 13. Exteriorly adjacent to said bearings the sleeve 9 carries integral radial arms 14 which carry a ring 15 centered in the axis of the live axle 3. A companion ring 16 is secured by bolts 17 to the ring 15 and portions of the two rings 15 and 16 are spaced apart to accommodate pinions 18 journaled through anti-friction bearings 19 upon tubular shafts 20, the ends of which are mounted in said rings. Said pinions are adapted to be driven in common by a gear 21 fast upon the outer end of the axle 3, and have driving engagement with an internal ring gear 22 which is bolted fast to the wheel 2, as indicated at 23. Preferably the bolts 23 are also utilized to secure to said wheel a hub cap 24, which protects the gearing 18—21—22 from dust and dirt. The housing 4 has an extension 25 from its outer end which, as is best seen in Fig. 4, covers the arms 8 and the sleeve 9 without interfering with the swinging movement of said arms, presently to be described. The arms 8 are shown in Fig. 1 as having an integral collar 26 surrounding the sleeve 9, said collar providing at its outer end an abutment holding the bearings 13 in place. 27 designates a short depending arm rigidly carried by the housing 4, a torque rod 28 being pivoted at its rear end to said rod and having its forward end pivotally connected at 29 to the frame 1.

Considering now the operation of the described invention, it is to be understood first that the live axle 3 drives the wheel 2 through the gear train 21—18—22, the direction of rotation of the gears being indicated by arrows in Fig. 2. When the driving ground wheels encounter favorable traction conditions, the arms 8 hang substantially vertically, as Figure 4 shows. The resistance to the drive under the described conditions is less than the restraint imposed by the load upon the arms 8, and the reactive effect of the pinions 18 upon said arms transmitted through the rings 15 and 16, arms 14 and sleeve 9, is inadequate to shift said arms appreciably to raise the load. In case, however, the resistance to the drive exceeds the restraint imposed upon the arms 8, because of adverse traction conditions, said arms will swing forwardly and upwardly, through an angle proportionate to the difference between the resistance to the drive and the restraint exercised by the load upon said arms. Such a shifted position of the arms 8 is indicated in dash lines in Fig. 3. In case the drive suddenly encounters such a resistance, as when the clutch is thrown in on a heavily loaded vehicle, or when some obstacle in the roadway is encountered by the wheels, the resultant swinging of the arms 8 and lifting of the load by said arms exercises a highly desirable shock-absorbing effect, protecting the driving parts from the severe strains to which they would otherwise be subjected under such conditions.

Furthermore, when the arms 8 are forwardly swung, as described, the weight of the load, tending to return said arms to a vertical position, acts supplementary to the driving force to urge rotation of the wheels 2 in the proper direction, so that the resistance to the drive is much more readily overcome than would otherwise be the case.

The manner in which swinging of the shackles 6 accommodates the forward shifting of the leaf spring 5, as the latter raises the load, is clearly indicated in dash lines in Fig. 3.

The ready accessibility of the gear train 21—18—22, due to the location thereof exteriorly of the wheel 2, is one of the features of the invention.

It is further to be noted that the gearing 21—18—22, forms a speed reducing power transmission from the live axle 3 to the wheel as well as functioning to subject the arms to a rotative reaction from the driving force.

What I claim is:—

1. In a motor vehicle transmission mechanism, a live axle, a ground wheel journaled co-axially with said axle, a tubular member enclosing said axle, a load support, an arm rigidly depending from the tubular member and carrying said load support, and gearing establishing a drive from said live axle to said wheel and rotatively reacting upon said tubular member to rock the same in a direction reverse to that of the wheel.

2. A motor vehicle transmission as set forth in claim 1, said load support being pivotal upon the lower end of said arm.

3. In a motor vehicle transmission mechanism, a live axle, a ground wheel journaled co-axially with said axle, a tubular member enclosing said axle, a load support, an arm rigidly depending from the tubular member and carrying said load support, a gear fast upon said live axle, a pinion meshing with said gear, an annular gear carried by the wheel and having driven engagement with said pinion, and a mounting for said pinion rigidly carried by said tubular member, said pinion being orbitally actuated when the resistance to the drive reaches a predetermined value, effecting a rocking of said tubular member and arm in a direction reverse to that in which the wheel is driven.

4. In a motor vehicle transmission mechanism, a live axle, a wheel driven thereby, a speed reducing gear train arranged exteriorly of said wheel, establishing the drive thereto from the axle, means utilizing a reaction effect of said gear train to cushion stresses opposing the drive, and a cap secured to the wheel and covering said gear train, and detachable from the wheel independently of said gear train, said cap having a bearing therein for said shaft.

5. In a motor vehicle transmission mechanism, a live axle, a wheel driven thereby, speed reduction mechanism driving said wheel from said axle, a sleeve enclosing the axle reacted upon rotatively by said mechanism, a load support rigidly depending from said sleeve, a housing for said axle and a torque rod connected to said housing.

6. In a motor vehicle transmission mechanism, a ground wheel, an annular gear carried by said wheel, a drive gear coaxial with said wheel, a pinion forming a drive connection from said drive gear to said annular gear, a load support mounted to swing about the axis of said wheel, and a mounting for said pinion actuable about the wheel axis by the reaction of said pinion to the driving force which it transmits, and subjecting said load support to said reaction.

7. In a motor vehicle transmission mechanism, a live axle, a wheel driven thereby, a speed reduction mechanism driving said wheel from said axle, a sleeve enclosing the axle reacted upon rotatively by said mechanism, a load support rigidly carried by said sleeve, a spring mounted on said load support, a housing for said axle, a torque rod connected to said housing, a frame for said vehicle, and a common means connecting said spring and said torque rod to said frame.

8. In a motor vehicle transmission mechanism, a ground wheel, an annular gear carried by said wheel, a drive gear coaxial with said wheel, a pinion forming a drive connection from said drive gear to said annular gear, a mounting for said pinion actuable about the wheel axis by the reaction driving effect of said pinion, and subjecting said load support to such effect, a cover for said gears and pinion, and a common means securing said cover and annular gear to the wheel.

9. In a motor vehicle transmission mechanism, a live axle, a wheel driven thereby, a speed reducing train arranged exteriorly of said wheel establishing the drive thereto from the axle, a load receiving frame, a supporting spring for said frame, a swinging connection between said spring and frame, a support for said spring mounted to swing fore and aft to effect a raising or lowering of the spring and frame, and means for utilizing a reaction of said gear train to effect swinging of said spring support.

10. In a motor vehicle transmission mechanism, a live axle, a wheel driven thereby, a speed reducing gear train arranged exteriorly of said wheel, establishing the drive to the wheel from the axle, a member movable angularly coaxial with said wheel, and subjected to the reaction effect of said gear train, a frame for receiving a load, and a support for said frame mounted upon said angularly movable member, and adapted for a swinging fore and aft motion whereby the weight of the load is opposed to the swinging of said member and to the reaction effect of said gear train.

11. In a motor vehicle transmission mechanism, a ground wheel, driving mechanism therefor, a load support mounted to swing above the axis of said wheel, anti-friction bearings carried by the wheel and in which said load support is mounted, means coaxial with the wheel reacting from said drive mechanism upon said load support, a load receiving frame and a spring mounting said frame upon said load support, and free to swing relative to the frame with the load support whereby the weight of the load is opposed to swinging of the load support and to the reaction effect of said drive mechanism.

In testimony whereof I sign this specification.

EARL L. HARRY.